Patented June 18, 1940

2,204,729

UNITED STATES PATENT OFFICE 2,204,729

TREATMENT OF PARTIALLY RANCID GLYCERIDES

Carleton Ellis, Montclair, and Frederic Dannerth, East Orange, N. J., assignors, by direct and mesne assignments, to Ellis Laboratories, Inc., Montclair, N. J.

No Drawing. Application December 15, 1937, Serial No. 179,948

4 Claims. (Cl. 99—118)

This invention relates to the restoration and improvement in flavor of food products which have become rancid, and in particular to edible oils and fats. It also involves the preparation of materials to be employed for the restoration of rancid foods.

When food products are exposed to the air, or other oxygen-containing gases, various complex, undesirable reactions due to oxidative action take place whereby the color, odor, taste, composition and other properties of the food are altered to a greater or lesser degree. These many changes in properties may be included under the term development of rancidity or oftentimes merely rancidity. The rate at which a food product becomes rancid depends not only on the degree of exposure but also on the temperature during exposure and the presence or absence of light. For the same degree of exposure of the food product, rancidity is hastened by increase in temperature and the presence of light.

Some of the chemical reactions involved in rancidity include those which give rise to the production of aldehydes, ketones, peroxides, acids and the like, and eventually result in the food becoming unfit for consumption. The term partial rancidity is hereinafter used to refer to such rancidity as that described above which may be eliminated by the treatment herein set forth. Provided the last-named state has not been attained but rancidity has proceeded only to the extent that the food has become unattractive and lost its appeal to the consumer, we have found that certain rancid foods may be restored by suitable treatment with certain products derived from plants and whose preparation and utilization are hereinafter described. By such treatment we find that in many instances these foods not only regain their palatable qualities but also are improved in odor and/or taste, thereby increasing their appeal to the user.

Those food products which we find most applicable to our invention are edible oils and fats. Examples are lard (including those varieties derived from hog or beef fats), various edible oils either vegetable or animal origin, e. g., cottonseed or corn oil and cod-liver oil, and fats such as butter which are derived from animals. All of the above mentioned foods may be included under the term edible fats.

The restorative agents which we have observed to be particularly effective are dried and pulverized portions of fruits, vegetables or edible parts of flowering or fruit-bearing plants. Examples of materials which are applicable for the preparation of restorative agents according to our invention are apples or pears (as fruits), peas or beans (as vegetables), and carrots or potatoes (as edible portions of plants). Any of these may be used in whole or in part. Furthermore, either the ripe or unripe plant product may be employed. We do not wish to imply, however, that restoratives made from ripe plant products are always equally effective as those prepared from unripe plant products, or vice versa, as we observe in some instances that one type of agent exhibits a greater restorative action than the other. We do find, nevertheless, that both types of agents always exert at least some restorative action and that the most effective one (i. e., whether prepared from unripe or ripe plant material) can be readily determined by experiment.

By the terms unripe and ripe we mean plant products which have not attained full maturity and which have attained full maturity, respectively. These terms are recognized and well understood by those who have a knowledge of or are engaged in the cultivation and propagation of plants.

One method whereby we prepare a restorative agent for rancid food is to macerate or grind the desirable plant part, and then, if necessary, heat at a temperature preferably not over 50° C. until a mass is obtained which may be readily pulverized. An alternative procedure is to admix unripe and ripe plant parts in any desired proportion, macerate (or grind) the mixture and then subject it to a heating operation. Still another modification comprises separately macerating (or grinding) different plant products (either unripe or ripe), subjecting these individually to a heating operation, pulverizing the heated materials to powders, and mixing the latter in any desired proportions.

For the most part, the heating step may be conducted at atmospheric pressure. In some instances, however, it may be preferable to employ reduced or subatmospheric pressures. In other cases, heating can be carried out in the presence of an inert gas, e. g., nitrogen.

To effect restoration of rancid food products, the latter (if a liquid) can be admixed with the restorative agent and kept in intimate contact therewith (by stirring, agitation or other suitable means, if necessary) for a short period of time. Afterwards the food product and agent are separated, e. g., by filtration, decantation, centrifuging or any other convenient method. In case the food product is a solid at atmospheric temperature, it may be liquefied by heating (preferably not over 50° C.) and treated as described above. Still another procedure comprises filtering the liquid, rancid food product through a column packed with the restorative agent. If the restorative agent, employed in any one of the aforementioned procedures, shall not have completely lost its effectiveness it may be reused one or more times or until the proportion of it needed to eliminate rancidity becomes unduly large.

We do not wish to limit our invention to the employment only of the dried restorative agent, as we find that in some instances an aqueous emulsion of the agent is satisfactory for getting rid of rancidity in food products.

The following examples will illustrate our invention. All parts are by weight unless otherwise designated.

Example 1.—Green (ripe), unroasted Santos coffee beans were subjected to a grinding process in which the silver skin or spermoderm was largely, though not completely, separated from the remainder of the bean. This ground skin was called bran. The latter, when ground, readily passed through a 10 mesh sieve. Forty parts of rancid butter were melted by heating to 50° C., thoroughly mixed with 10 parts of the bran, and the mixture stored for 1 hour at 50° C. Afterwards the liquid butter and solid bran were separated by filtration. The restored fat so obtained no longer possessed a rancid or disagreeable odor. Furthermore, tests indicating substantial elimination of rancidity were secured with the treated product.

Example 2.—Green (ripe) Santos coffee beans were ground, making no attempt at separation as described in Example 1. In this instance the ground material passed an 18-mesh sieve. Ten parts of the bean were emulsified with 50 parts of water. To the emulsion were added 50 parts of liquid, rancid butter. The mixture was maintained at a temperature of 50° C. for 1 hour, after which the aqueous layer was removed from the liquid fat. The latter was found to possess a much more agreeable odor than the untreated butter, and gave only slightly positive tests for rancidity.

Example 3.—One hundred parts of a fat composition, consisting of mixed animal fats and which gave pronounced reactions for rancidity, were melted by heating to a temperature of 40° C. Twenty parts of ground coffee bean, as described in Example 2, were incorporated with the liquid fat. The mixture was kept at a temperature of 50° C. for one hour, and then allowed to remain at room temperature (about 25° C.) for 16 hours. Afterwards the mixture was warmed sufficiently to melt the fat and the latter separated from the treating agent by centrifuging. On examination the restored fat was observed to be substantially non-rancid.

We are aware that vegetative material in the form of powder has been proposed as a dusting or coating preparation for the preservation of food products or the prevention of rancidity therein. Our invention should be clearly distinguished from such in that we treat edible oils or fats, which have become rancid, with edible plant products and thereby eliminate, remove or in some other manner counteract the influence of those obnoxious bodies (in the oil or fat) which are responsible for the condition known as rancidity. In this manner there is secured a non-rancid or substantially non-rancid edible oil or fat.

As pointed out previously, rancidity may develop to such an extent that the oil or fat (or some constituents thereof) may have suffered decomposition or other undesirable changes to such a degree as to render the material unfit for consumption. Our invention is applicable particularly before the food product, because of long storage or other conditions, has attained such a stage. Preferably our invention should be applied when rancidity has developed only to a point where the food because of undesirable alterations in color, taste, odor, appearance or other qualities has lost some of its appeal or attractiveness to a potential user or consumer thereof.

We note in many instances our treatment results in either maintaining or altering (i. e., modifying or improving) the flavor of the food product, and this effect also forms a part of our invention. By flavor we mean the combined and simultaneous effect produced by those two qualities of a food known and designated as odor and taste.

The restorative agents specially suitable for our purpose are those derived from the edible fruits, vegetables or portions of plants. These edible fruits, vegetables or portions of plants may be either unripe or ripe, i. e., immature or mature. These may be macerated, comminuted or otherwise reduced to a powdered or finely divided state in which they are easily handled and intimate contact between the restorative agent and rancid product to be treated thereby is obtained. When the plant material contains sufficient water or other volatile liquid so as to render grinding and reducing to a powder difficult, then the pulverizing operation may be preceded by a heating step at a temperature preferably not above 50° C.

Treatment of the rancid material may be effected by directly contacting, in some convenient manner, the rancid food product with the restorative agent. Afterwards the treating agent and fat are separated in some convenient manner. In this manner we effect clarification, stabilization and restoration of animal or vegetable fats and oils. The temperature during this step may be slightly elevated, but preferably should not exceed 100° C. Furthermore, we do not limit our invention to direct contacting of rancid food and restorative agent, as the latter may be dispersed in water, for example, and the aqueous dispersion employed for the substantial elimination of rancidity.

What we claim is:

1. The process of treating partially rancid edible glycerides which comprises treating said partially rancid edible glyceride with a comminuted edible mass of a flowering plant at a temperature sufficiently high to eliminate the rancidity of the glyceride, but not exceeding 100° C. and separating the glyceride from the residual comminuted plant product whereby a substantially non-rancid edible glyceride is obtained.

2. The process of treating partially rancid edible glycerides which comprises treating said partially rancid edible glyceride with a comminuted edible mass of an unripe flowering plant at a temperature sufficiently high to eliminate the rancidity of the glyceride, but not exceeding 100° C., and separating the glyceride from the residual comminuted plant product whereby a substantially non-rancid edible glyceride is obtained.

3. The process of treating partially rancid edible glycerides which comprises treating said partially rancid edible glyceride with an aqueous emulsion of a comminuted edible mass of a flowering plant at a temperature sufficiently high eliminate the rancidity of the glyceride but not exceeding 100° C., and separating the glyceride from the emulsion of plant product whereby a substantially non-rancid glyceride is obtained.

4. The process of treating partially rancid edible glycerides which comprises treating said partially rancid edible fat with a comminuted edible mass selected from the group consisting of dried and pulverized portions of fruits, vegetables and edible parts of flowering and fruit bearing plants at a temperature sufficiently high to eliminate the rancidity of the glyceride but not exceeding 100° C. whereby the rancid bodies in the rancid edible fat are substantially eliminated.

CARLETON ELLIS.
FREDERIC DANNERTH.